(12) United States Patent
Rosvold et al.

(10) Patent No.: US 11,686,181 B2
(45) Date of Patent: Jun. 27, 2023

(54) LOCKING MECHANISM TOOL AND SYSTEM

(71) Applicant: VETCO GRAY SCANDINAVIA AS, Nailsea (GB)

(72) Inventors: Odd Marius Rosvold, Sandvika (NO); Dario Marchetti, Florence (IT); Philip Tarr, Nailsea (GB); Staale Svindland, Sandvika (NO); Leonardo Lani, Florence (IT); Erik Raad, Sandvika (IT)

(73) Assignee: Vetco Gray Scandinavia AS

( * ) Notice: Subject to any disclaimer, the term of this patent is extended or adjusted under 35 U.S.C. 154(b) by 230 days.

(21) Appl. No.: 17/290,076

(22) PCT Filed: Nov. 20, 2019

(86) PCT No.: PCT/EP2019/025405
§ 371 (c)(1),
(2) Date: Apr. 29, 2021

(87) PCT Pub. No.: WO2020/104060
PCT Pub. Date: May 28, 2020

(65) Prior Publication Data
US 2021/0396099 A1    Dec. 23, 2021

(30) Foreign Application Priority Data
Nov. 21, 2018  (NO) .................................. 20181486

(51) Int. Cl.
*E21B 41/04*    (2006.01)
*F15B 15/26*    (2006.01)
*H02G 1/10*    (2006.01)

(52) U.S. Cl.
CPC ............ *E21B 41/04* (2013.01); *F15B 15/261* (2013.01); *H02G 1/10* (2013.01)

(58) Field of Classification Search
CPC .......... E21B 41/04; F15B 15/261; H02G 1/10
See application file for complete search history.

(56) References Cited

U.S. PATENT DOCUMENTS

| | | | | |
|---|---|---|---|---|
| 3,312,283 | A | * | 4/1967 | Yetman .................... E21B 23/03 166/383 |
| RE27,294 | E | * | 2/1972 | Fredd ..................... F15B 15/261 91/44 |
| 4,031,969 | A | * | 6/1977 | Cullen .................. E21B 17/003 166/66.4 |
| 4,807,700 | A | * | 2/1989 | Wilkins .................. E21B 34/02 251/341 |
| 5,056,418 | A | * | 10/1991 | Granger ................ E21B 33/062 92/24 |

(Continued)

FOREIGN PATENT DOCUMENTS

GB         2352312 A  *  1/2001  ......... E21B 33/0355

*Primary Examiner* — Aaron L Lembo
(74) *Attorney, Agent, or Firm* — Baker Hughes Patent Organization (57) ABSTRACT

The present invention relates to a locking mechanism or tool adapted for connection to a remotely operated vehicle and adapted for at least one of the group consisting of connection and disconnection of two plates. The present invention also concerns a system adapted for at least one of the group consisting of connection and disconnection of two plates, where the system comprises said locking mechanism or tool.

10 Claims, 10 Drawing Sheets

(56) References Cited

U.S. PATENT DOCUMENTS

| | | | | |
|---|---|---|---|---|
| 5,794,701 | A * | 8/1998 | Cunningham | E21B 43/013 166/344 |
| 5,857,715 | A * | 1/1999 | Gray | F16L 55/46 285/284.1 |
| 6,006,647 | A * | 12/1999 | Van Winkle | E21B 33/063 92/28 |
| 6,186,237 | B1 * | 2/2001 | Voss, Jr. | E21B 33/047 166/348 |
| 6,644,410 | B1 * | 11/2003 | Lindsey-Curran | E21B 33/0385 166/341 |
| 7,913,716 | B2 * | 3/2011 | Ostergaard | E21B 33/038 251/149.6 |
| 8,662,181 | B2 | 3/2014 | Hamblin et al. | |
| 8,936,481 | B2 * | 1/2015 | Asak | H01R 4/20 439/275 |
| 8,991,501 | B2 * | 3/2015 | Roberts | E21B 33/038 166/344 |
| 9,309,739 | B2 * | 4/2016 | Wright | E21B 33/038 |
| 9,353,592 | B2 | 5/2016 | Kekarainen | |
| 9,732,595 | B2 * | 8/2017 | Wright | E21B 17/02 |
| 9,874,068 | B2 * | 1/2018 | Wright | E21B 33/14 |
| 10,240,438 | B2 * | 3/2019 | Hestetun | F16L 1/26 |
| 10,655,406 | B2 * | 5/2020 | Hande | E21B 36/005 |
| 10,655,454 | B2 * | 5/2020 | Bigarella | B32B 37/15 |
| 11,286,739 | B2 * | 3/2022 | June | E21B 33/0422 |
| 2004/0127084 | A1 * | 7/2004 | Glennie | E21B 33/0385 439/316 |
| 2006/0249290 | A1 * | 11/2006 | Bartlett | E21B 23/04 166/338 |
| 2007/0289745 | A1 * | 12/2007 | Richards | E21B 33/035 166/338 |
| 2009/0050328 | A1 * | 2/2009 | Bath | F16L 59/14 166/338 |
| 2009/0233774 | A1 * | 9/2009 | McCoy, Jr. | E21B 41/04 483/1 |
| 2010/0021238 | A1 * | 1/2010 | Mogedal | F16L 1/26 405/169 |
| 2010/0319933 | A1 * | 12/2010 | Baugh | E21B 33/068 166/381 |
| 2012/0199358 | A1 * | 8/2012 | Larsson | F16L 1/26 166/341 |
| 2014/0262304 | A1 * | 9/2014 | Bushman | E21B 41/0007 166/335 |
| 2017/0241243 | A1 * | 8/2017 | Gomes Martins | E21B 43/01 |
| 2017/0362910 | A1 * | 12/2017 | Stephens | E21B 33/143 |
| 2018/0163499 | A1 | 6/2018 | Powell | |

* cited by examiner

LOCKING MECHANISM TOOL AND SYSTEM

The present invention relates to a locking mechanism or tool and a system adapted for at least one of: connection and/or disconnection of two multi quick connectors for subsea applications.

Some locking mechanisms of the mechanical type are known for underwater use, wherein mating is performed by use of threaded rod bar(s) and/or torque tool(s). This makes the installation or operation process(es) or phase(s) quite time consuming.

It is therefore an object of the invention to provide a locking mechanism or tool and a locking mechanism system for subsea applications that could enable rapid timing for mating and locking of different underwater parts.

Another object of the invention is to provide an improved connection and a tool or locking mechanism and a system for connection of an outboard end to a permanent subsea installation or fixed host structure.

Another object of the invention is to provide a fail free locking tool or mechanism and such a system.

Yet another object of the invention is to provide for cost effective installation or operation process(es) or phase(s).

Yet another object of the invention is to provide a locking mechanism or tool and a locking mechanism system for subsea applications that are compliant with subsea requirements set by an operator and/or an authority.

According to a first aspect of the invention, this is achieved with a tool or mechanism for underwater use and adapted for connection and disconnection of a flying plate and a fixed plate.

According to a second aspect of the invention, this is achieved with a system using such a tool or mechanism.

The main features of this invention are given in the independent claims. Additional features of the present invention are given in the dependent claims.

The invention teaches a tool adapted for at least one of: connection and/or disconnection of a set of a flying plate and a fixed plate. The tool comprises a glide bush and a front housing. The front housing is mounted onto the glide bush and partially covers the glide bush. A main shaft is moveably arranged within the glide bush. A pushrod has a cone at one end thereof. The pushrod is axially moveably arranged within the main shaft in order to operate in radial direction one or more locking dogs. The tool further comprises one or more plungers in the glide bush. Each plunger is arranged to be radially moveable within the glide bush so that each plunger is adapted to be outwardly and radially extended when being subject to a force. The glide bush further comprises one or more radial bores therein. Each radial bore is connected, at one side, to a source hydraulic channel [see page 7] in the front housing and, at its other side, to a respective axial canal. Each axial canal is arranged in the glide bush and dedicated for further connection to its respective plunger. Said one or more plungers is(are) adapted to be hydraulically operated by a hydraulic fluid provided from a hydraulic fluid source.

On its outer side, each plunger has a half-spherical shape.

Each locking dog has an outer toroidal shape, where a number of locking dogs arranged around the cone will form a segmented ring shape.

Each plunger comprises a plunger collar on the inner end section thereof. Each plunger is arranged in a plunger bore in the glide bush. A plunger retainer is arranged in the bore to abut against the plunger collar. A plunger spring is arranged between the plunger retainer and the plunger collar.

A rear end section of the main shaft is provided with a chamber, wherein a push rod piston is arranged. A retraction spring is biased between the push rod piston and the inner surface of the chamber.

A main piston of the tool is fixed to and encircling the main shaft thereof. A main cylinder is slidably connected to and encircling the main piston. The main cylinder has a rear end and a forward end, wherein a first main cylinder end cap is arranged at the rear end of the main cylinder, and a second main cylinder end cap is arranged at the forward end of the main cylinder. The end caps are slidably connected to the main shaft and fixed to the main cylinder end sections. A first fluid chamber is formed between the main shaft, the main cylinder, the first main cylinder end cap and the main piston. A second fluid chamber is formed between the main shaft, the main cylinder, the main piston and the second main cylinder end cap. The fluid chambers are in fluid communication with a hydraulic fluid source whereby hydraulic fluid can be entered into or let out of the fluid chambers in order to move the main piston and thereby the main shaft.

The invention also teaches a system adapted for at least one of: connection and/or disconnection of a set of a flying plate and a fixed plate. The set of the flying plate and the fixed plate comprises multiple connectors. The system comprises the above mentioned tool, a remotely operated vehicle (ROV). the outboard/flying plate arranged at an end of a bundle, and the inboard/fixed plate mounted onto a host structure or subsea installation. The locking tool is adapted to be connected to the ROV. The tool is further adapted for at least one of: connection and/or disconnection of the plates. [see page 4]

The host structure can be at least one of: X-mas tree, manifold, subsea distribution unit (SDU), umbilical termination assembly (UTA).

The plates can be multi/multiple quick connection/connector (MQC) stab plates.

The plates can further comprise coarse and fine guiding mechanisms/means.

The bundle is adapted for connection of two host structures.

These and other aspects of the invention are apparent from and will be further elucidated, by way of example(s), with reference to the drawings, wherein:

FIGS. 5a-5c show in detail the mating between the tool and the fixed plate on FIG. 4a.

The present invention concerns a tool 10 with locking mechanisms intended for subsea applications. The tool 10 is adapted to be used in a locking mechanism system 100, as illustrated on FIG. 1. The tool 10 is adapted to be attached to, held and operated by a remotely operated vehicle (ROV) 20. The tool 10 can be used to connect a flying multiple quick connect, MQC, to a fixed plate on a subsea structure. The tool 10 is fully hydraulically operated. The tool 10 is adapted to provide a robust lock between an outboard/flying plate 50 with couplers, the flying plate 50 being arranged at each end of a bundle 55, and an inboard/fixed plate 40 with couplers, the fixed plate 40 being arranged on a host structure or a subsea installation 30 or 31. The tool 10 is adapted to be able to engage with the flying plate 50 and then with the fixed plate 40 in order to mate and connect together the flying plate 50 and the fixed plate 40, including all their multiple dedicated lines, such as, but not limited to, e.g. fluid, hydraulic, chemical, electric, etc. Disconnection of the plates is enabled by means of the tool 10. The bundle 55 can be used to connect two subsea installations 30, 31.

Figure 1:
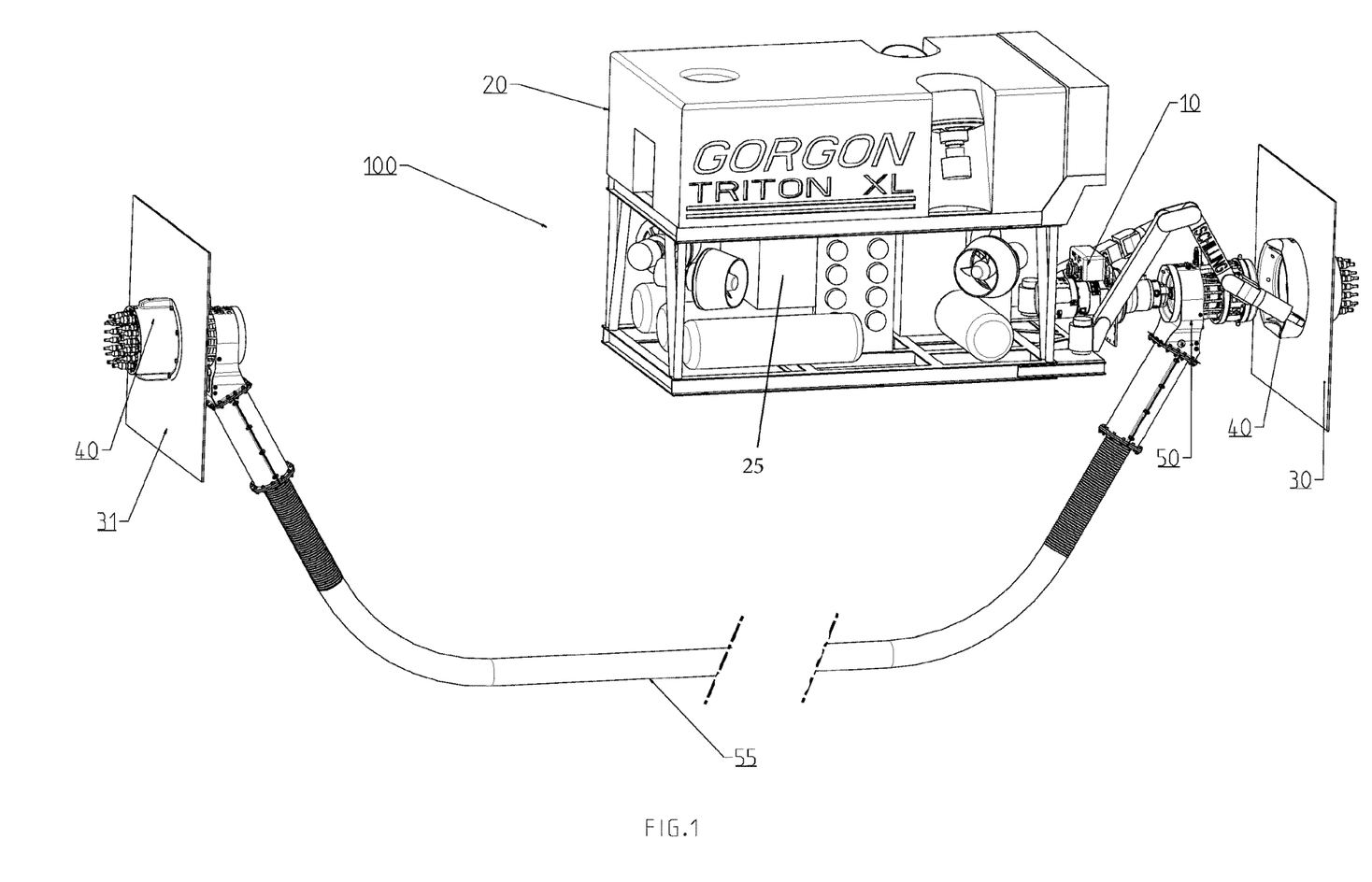
FIG. 1 shows a system for subsea applications according to the present invention.

The tool 10 guides the flying plate 50 into the fixed plate 40 and connects the two elements to each other. The tool 10 is then withdrawn from the plates 40, 50 and can be used on another connection.

The host structures/subsea installations 30, 31 can be, but are not limited to, e.g. X-mas trees, manifolds, subsea distribution units (SDUs), umbilical termination assemblies (UTAs), etc.

The plates 40, 50 can be, but are not limited to, e.g. multi/multiple quick connection/connector (MQC) stab plates. The fixed plate 40 and flying plate 50 comprise coarse and fine guiding means.

Figure 2:
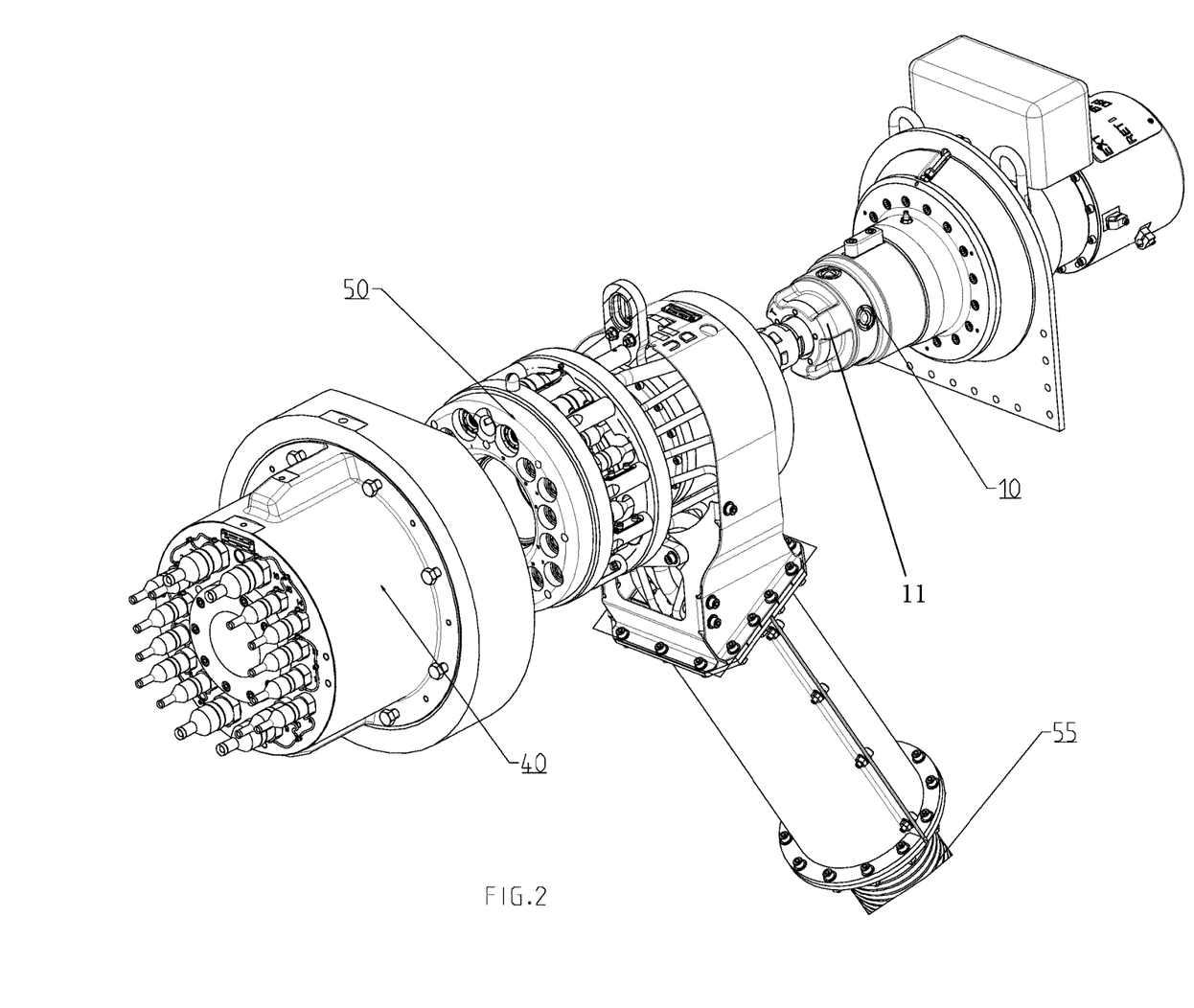
FIG. 2 shows a locking system according to the invention with an inboard/fixed plate, an outboard/flying plate and a ROV tool that are to be mated and/or connected together.

FIG. 2 shows the tool 10 together with the fixed plate 40 and the flying plate 50 to be mated or connected together. Alternatively, when desired or required, the two plates 40, 50 can be unlocked and/or disconnected by means of the tool 10. The ROV 20 is coupled to the tool 10 during the above-mentioned operations.

Figure 3:
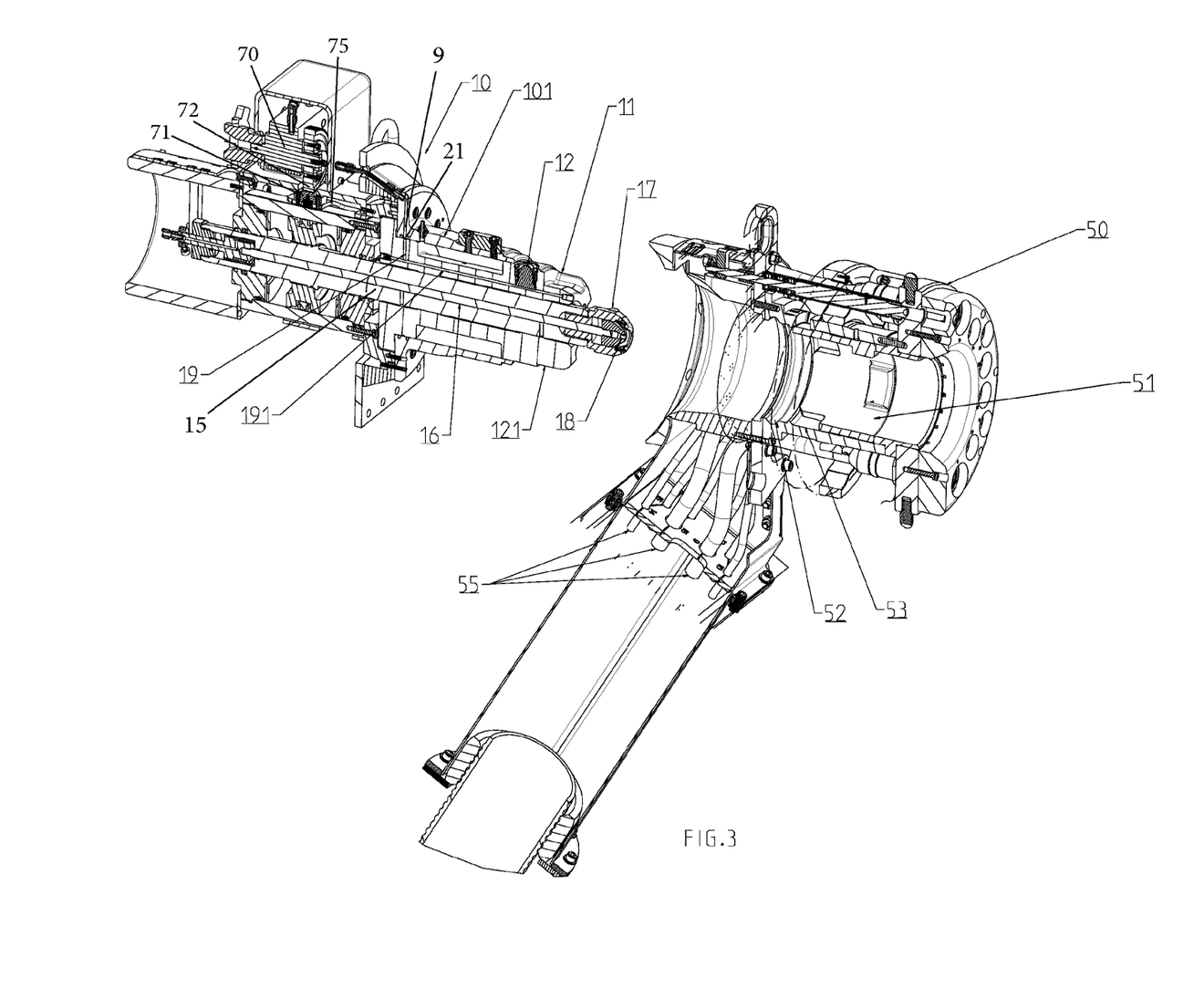
FIG. 3 illustrates a cross section of the flying plate and the tool according to the invention.

With reference to FIG. 3, for the coupling operation, the tool or mechanism 10 is flown to the flying plate 50 by means of a ROV 20 and engages with and/or begins docking with the plate 50. A glide bush 121 with teeth 11 (see e.g. FIG. 3) on the tool 10 fully engages with a latch collar 51 on the flying plate 50 and is aligned with a sleeve 53 of the flying plate 50. One or more plungers 12 on the tool 10 extend(s) outwardly and radially into an outer circumferential groove 52 arranged on the inner side of the sleeve 53 of the flying plate 50, so that the tool 10 will engage with the flying plate 50. The tool 10 thus locks to the flying plate 50.

Figure 4A:
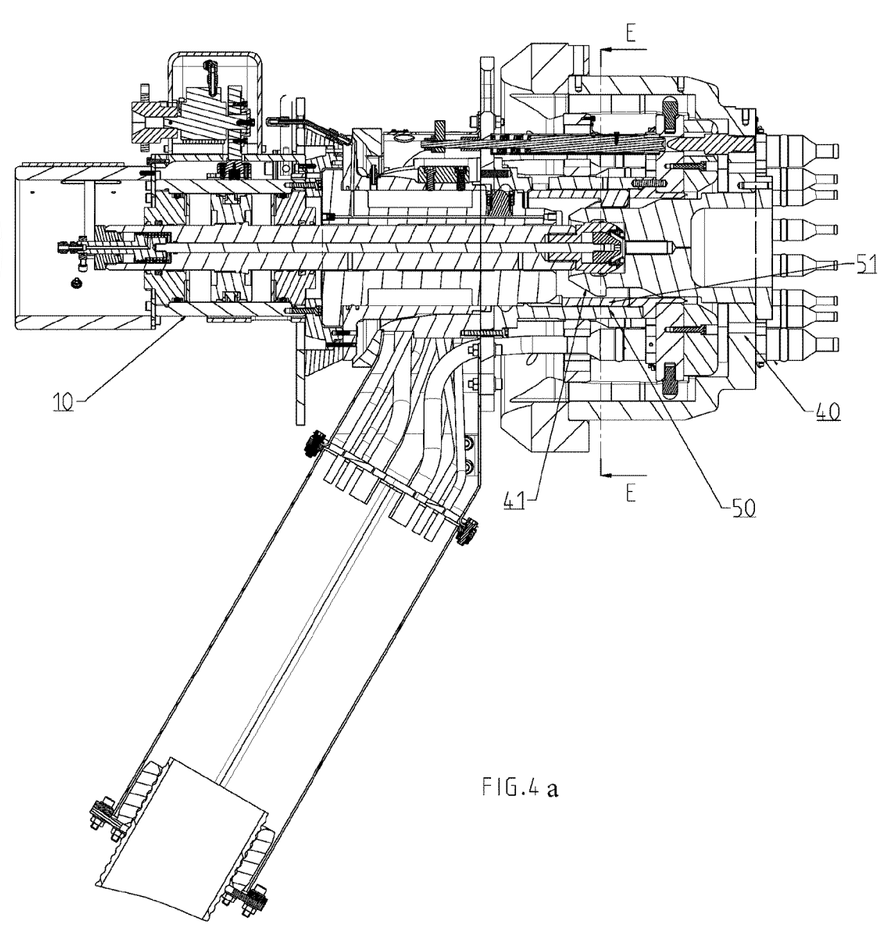
FIGS. 4a-4c illustrate the tool and the flying plate connected according to the invention.
Figure 4B:
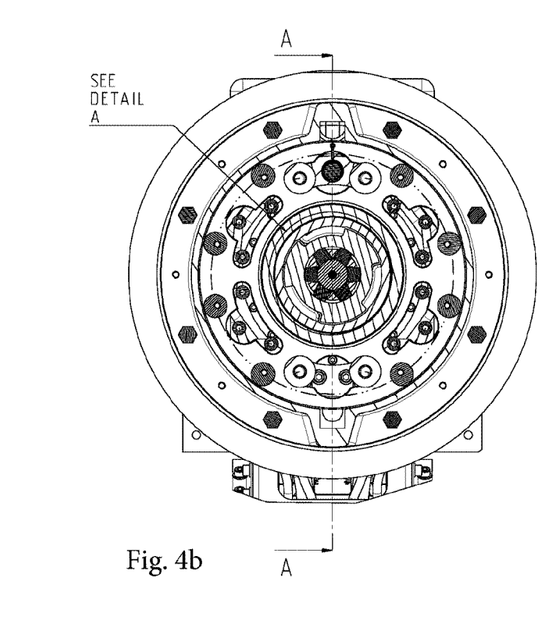
Figure 4C:
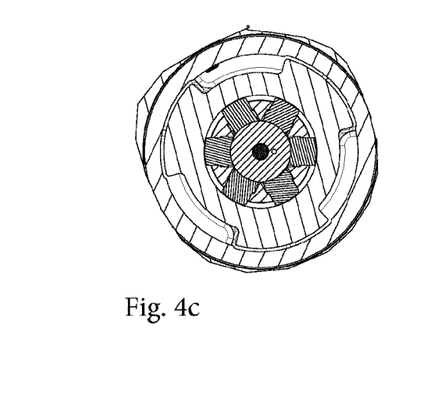

With reference to FIGS. 4a-4c, the ROV 20 enables the tool 10 to be locked to the flying plate 50, which is then flown to the fixed plate 40 of the installation or assembly 30. Then the latch collar 51 of the flying plate 50 is engaged with a fixed center spigot 41 of the fixed plate 40. In the current position, the latch collar 51 cannot rotate as it is engaged with the fixed center spigot 41. While engaged with the fixed center spigot 41, the latch collar 51 can slide around the circumference of the fixed spigot 41.

Figures 5A, 5B, 5C:
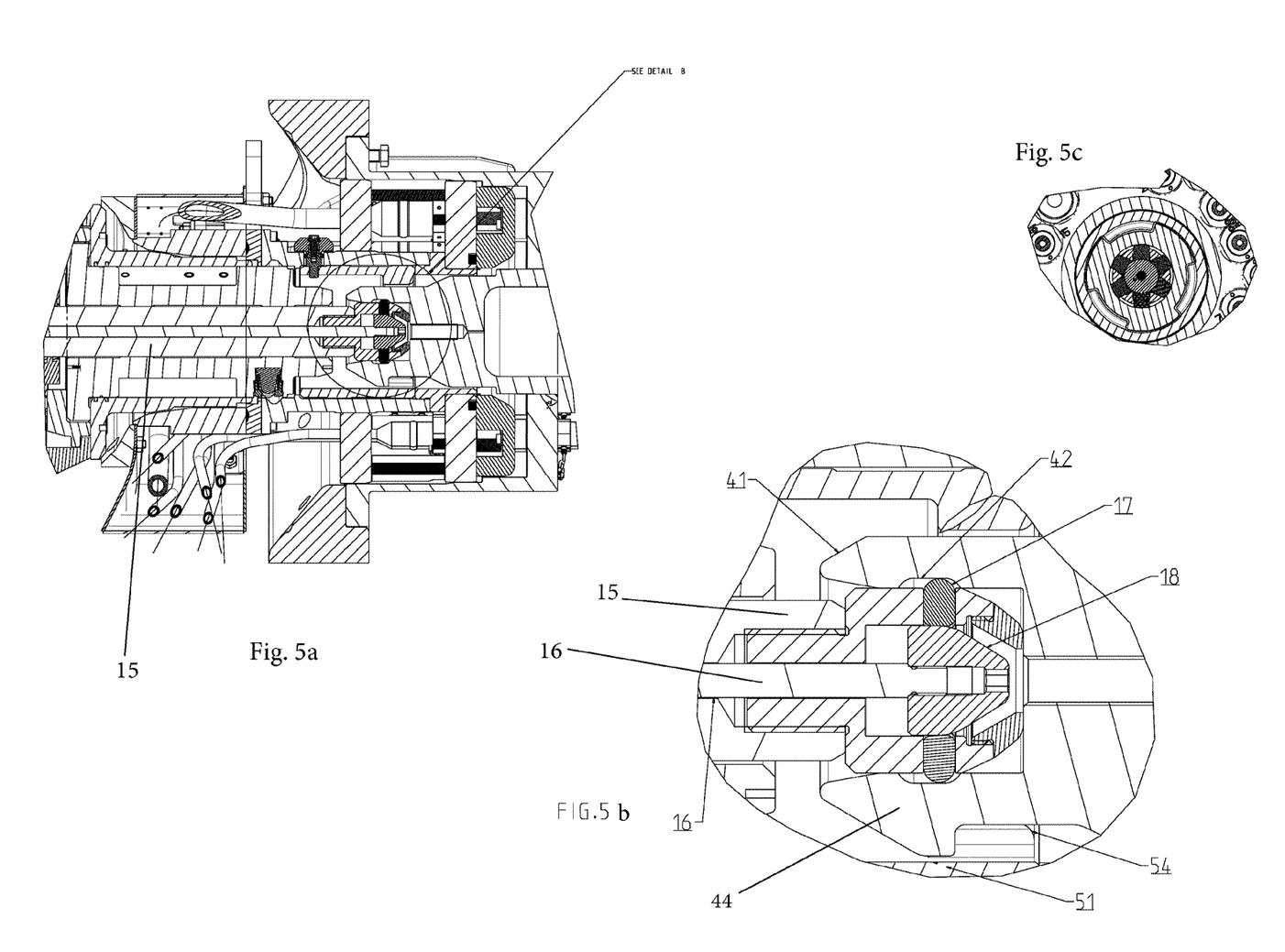

Reference is now made to FIGS. 5a-5c. Once the flying plate 50 is pulled into position, the latch collar 51 rotates, and then latch collar dogs 54 are placed behind spigot dogs 44, thus locking the flying plate 50 to the fixed plate 40. One or more locking dogs 17 is(are) arranged in a cone 18 at one end of a main shaft 15 of the tool 10. Each locking dog 17 is moveably arranged in a respective dog bore of the cone 18. The locking dogs 17 has an outer toroidal shape where a number of dogs arranged around the cone 18 will form a segmented ring shape, as seen on FIG. 5c. Each locking dog 17 comprises nobs in order to keep the locking dog 17 within the cone 18.

The locking dogs 17 engage with an internal groove 42 of the fixed spigot 41 by extending a pushrod 16 and the cone 18 within the main shaft 15 of the tool 10. In the current position, the latch collar 51 cannot rotate as it is engaged with the fixed spigot 41. The tool 10 is thus locked to the fixed plate 40.

The main shaft 15 of the tool 10 is then retracted in order to pull in the flying plate 50 into the fixed plate 40, so that each line from the multiple lines of a respective fixed plate coupler will be mated or coupled sealingly to the other respective line from the multiple lines of the other respective flying plate coupler. The plungers 12 of the tool 10 are retracted, which will thus allow rotation of the glide bush 121 of the tool 10 and the teeth 11 of the glide bush 121. In the current plate position, the glide bush 121 rotates by means of a rack 71 and pinion 72 arrangement shown on FIG. 3, and the latch collar 51 will rotate to the locked position and will lock the flying plate 50 to the fixed plate 40. The rack 71 and pinion 72 arrangement is connected to the glide bush 121 by means of at least one connecting bracket 75 shown on FIG. 3. The rack 71 and pinion 72 arrangement can be driven by a hydraulic motor 70 shown on FIG. 3. The hydraulic motor 70 can be driven by the hydraulic fluid source 25. The hydraulic fluid source 25 can be arranged, in a known manner, on the ROV 20 (see FIG. 1), and connected, in a known manner, to the tool 10. After the flying plate 50 is fixed or locked to the fixed plate 40, the tool 10 is unlocked from the fixed plate 40. The locking dogs 17 disengage from the internal groove 42 of the fixed spigot 41 by retracting the pushrod 16 and the cone 18. The plungers 12 are disengaged, and the tool 10 is unlocked from the fixed spigot 41 of the fixed plate 40, i.e. from the fixed plate 40. The tool 10 is unlocked from the flying plate 50, and the ROV 20 thrusts in reverse, thus withdrawing the tool 10 from the flying plate 50.

In other embodiments, different forms of the groove, such as e.g. trapezoid, and/or a different number of grooves can be possible. However, these embodiments should have the same functionality as specified above. The groove or grooves should mechanically resist the locking dogs 17 from being pulled axially outward. The groove or grooves should also push the locking dogs 17 radially inward when retracting the tool 10. As an example, a square groove could not satisfy the last requirement.

If it is desired to unlock the flying plate 50 from the fixed plate 40 in order to separate them from each other, the glide bush 121 rotates in a manner as previously described, and the latch collar 51 rotates to the unlocked position, thus unlocking the flying plate 50 from the fixed plate 40. The plungers 12 are then extended in order to lock the tool 10 to the flying plate 50. The locking dogs 17 are disengaged with the main shaft 15 fully extended. Then the tool 10 and the flying plate 50 can be withdrawn from the fixed plate 40.

As it is seen on FIG. 3, the locking tool 10 comprises a hollow glide bush 121 and a hollow front housing 101 mounted onto the glide bush 121. The main shaft 15 is axially moveable within the glide bush 121. The main shaft 15 can be hydraulically driven. The pushrod 16 is axially moveable within the main shaft 15. The pushrod 16 is hydraulically driven in order to operate the cone 18 and thus the locking dogs 17.

Figures 6A, 6B:
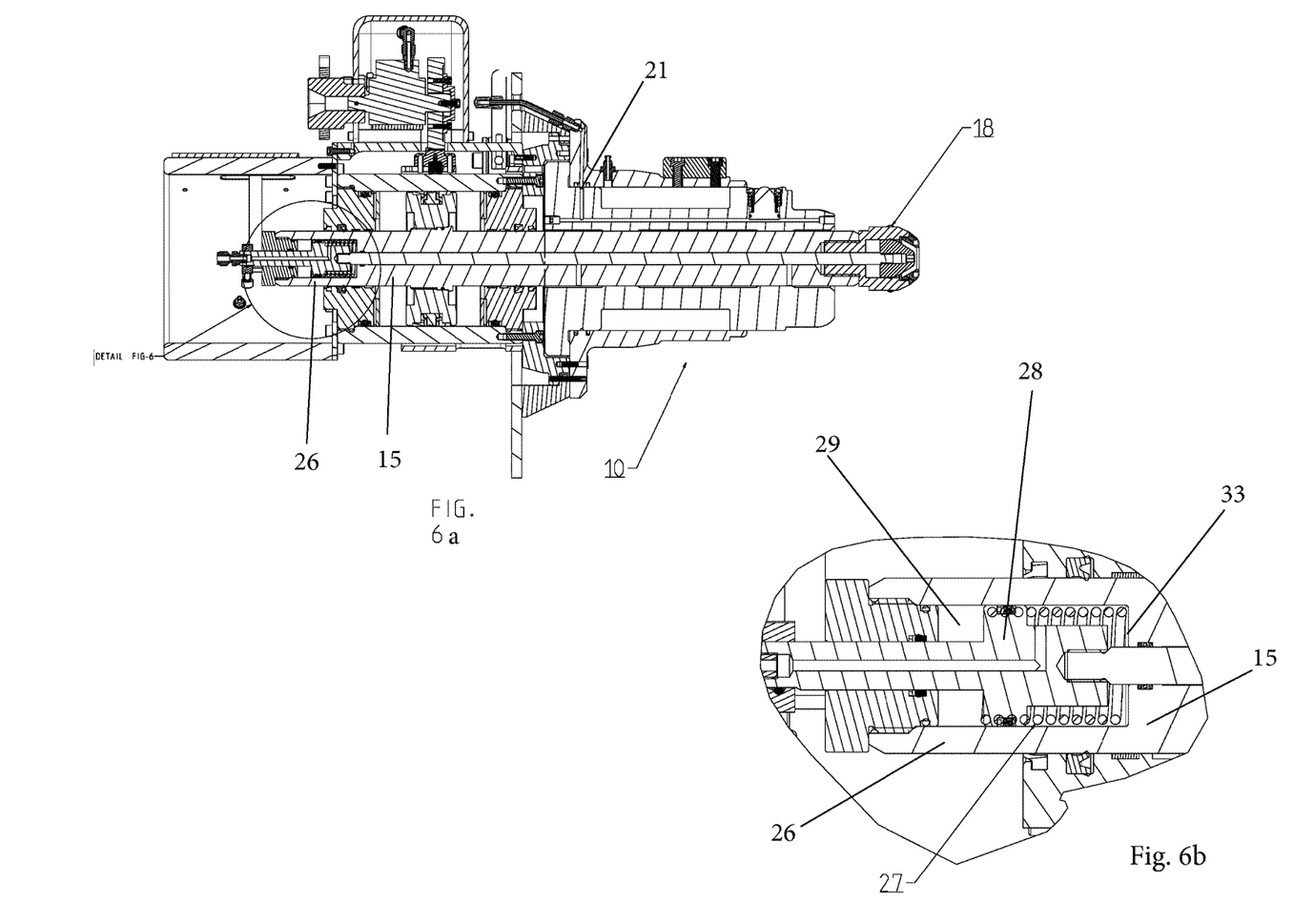
FIGS. 6a-6b show in detail other elements of the locking mechanism or tool that are being used if hydraulic power therein is removed and/or lost.

With reference to FIGS. 6a-6b, the rear end section 26 of the main shaft 15 is provided with a chamber 29 wherein a push rod piston 28 is arranged in order to hydraulically drive the pushrod 16. A retraction spring 27 is biased between the push rod piston 28 and an inner surface 33 of the chamber 29 arranged in the main shaft 15. A push rod end cap seals the chamber 29 and provides a rear end stop for the push rod piston 28.

With the rear end of the main shaft 15 and the rear end of the tool 10, it is here meant the end of the tool 10 that will be facing the ROV 20 holding the tool 10. The forward end of the main shaft 15 or the tool 10, is the end section that will be interfacing the flying plate and fixed plate elements when the tool 10 is connected to such elements. The terms "rear" and "forward" thereby define a direction pointing from the end that is closest to the ROV 20 when the tool 10 is in function towards the end that is closest to the elements being connected or disconnected.

Once the hydraulic power is removed, the pushrod 16 will be retracted by the retraction spring 27, thus the cone 18 will enable the locking dogs 17 to be retracted when the tool is being pulled out, as the locking dogs 17 will no longer be in an engaged or locked position, see FIGS. 5a-5b. This will ensure that the surface vessel isn't anchored to an inboard end of the host structure.

Figure 7A:
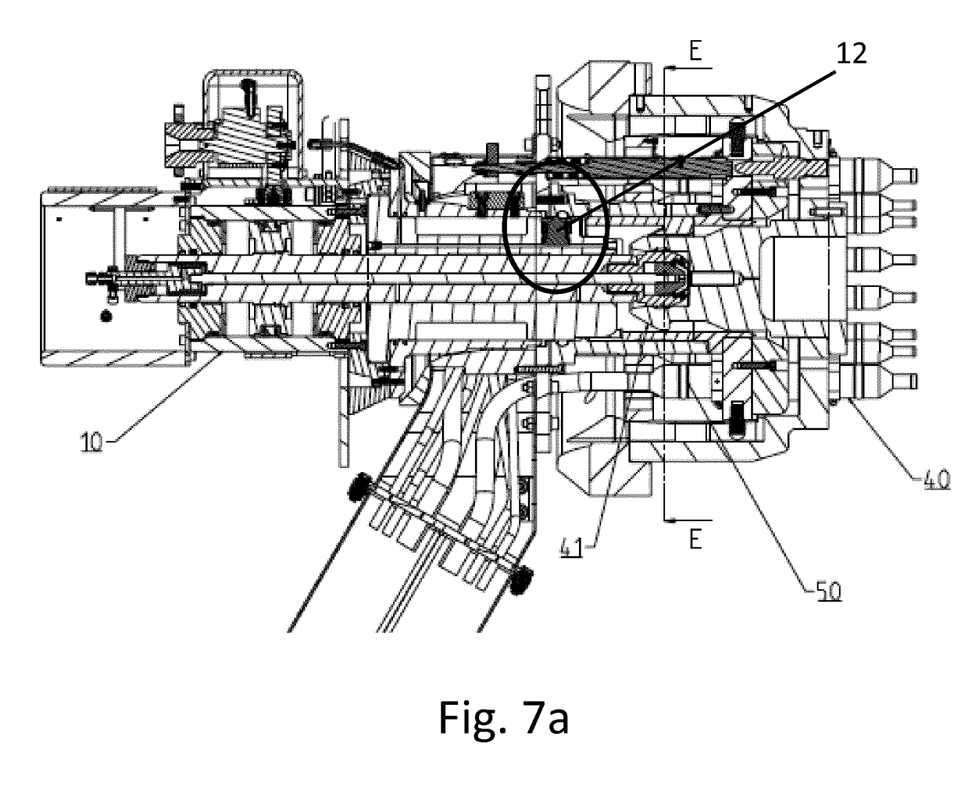
FIGS. 7a-7d illustrate in detail further elements of the locking mechanism or tool, such as a locking plunger (FIGS. 7a-7c) and main shaft pushing and pulling elements (FIG. 7d) of the tool.
Figure 7B:
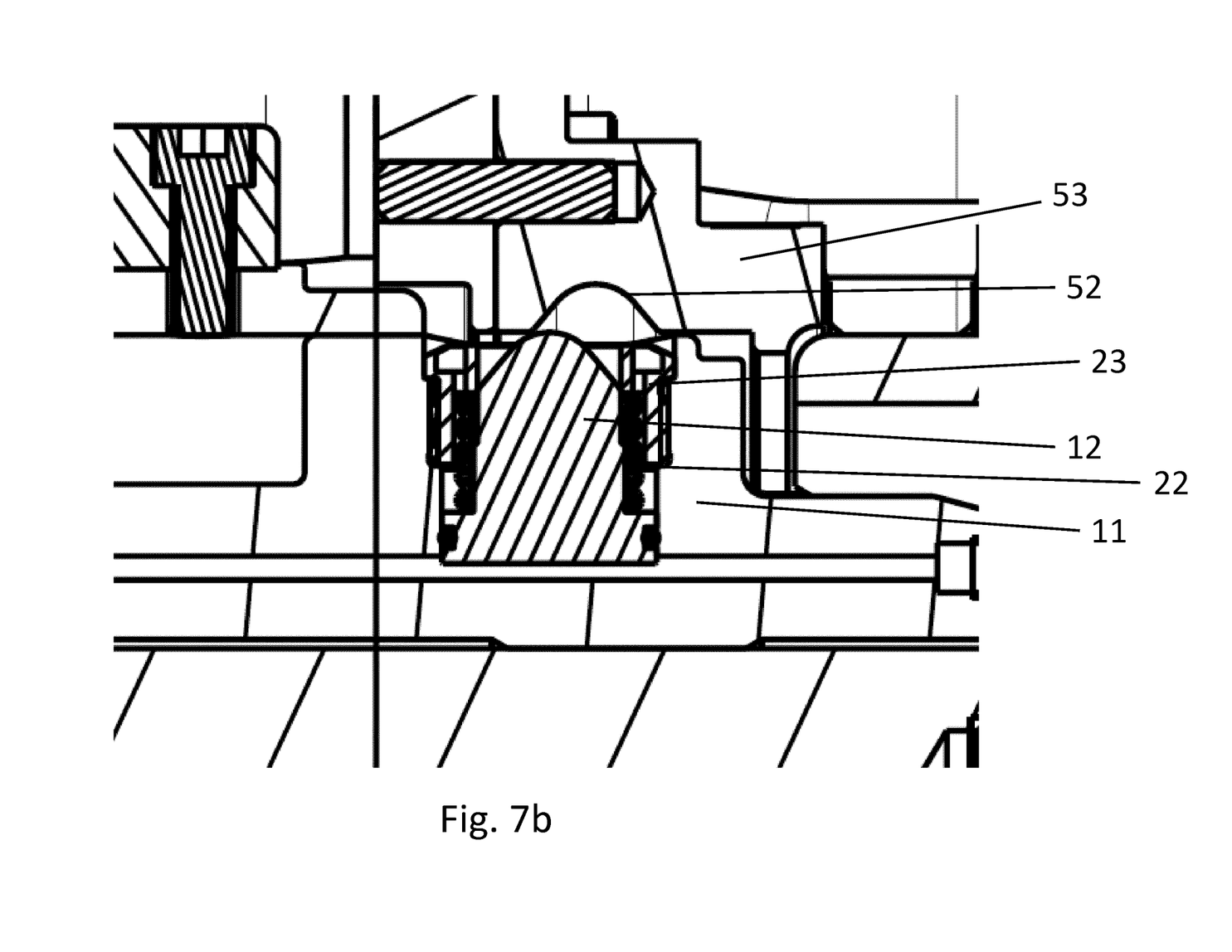
Figure 7C:
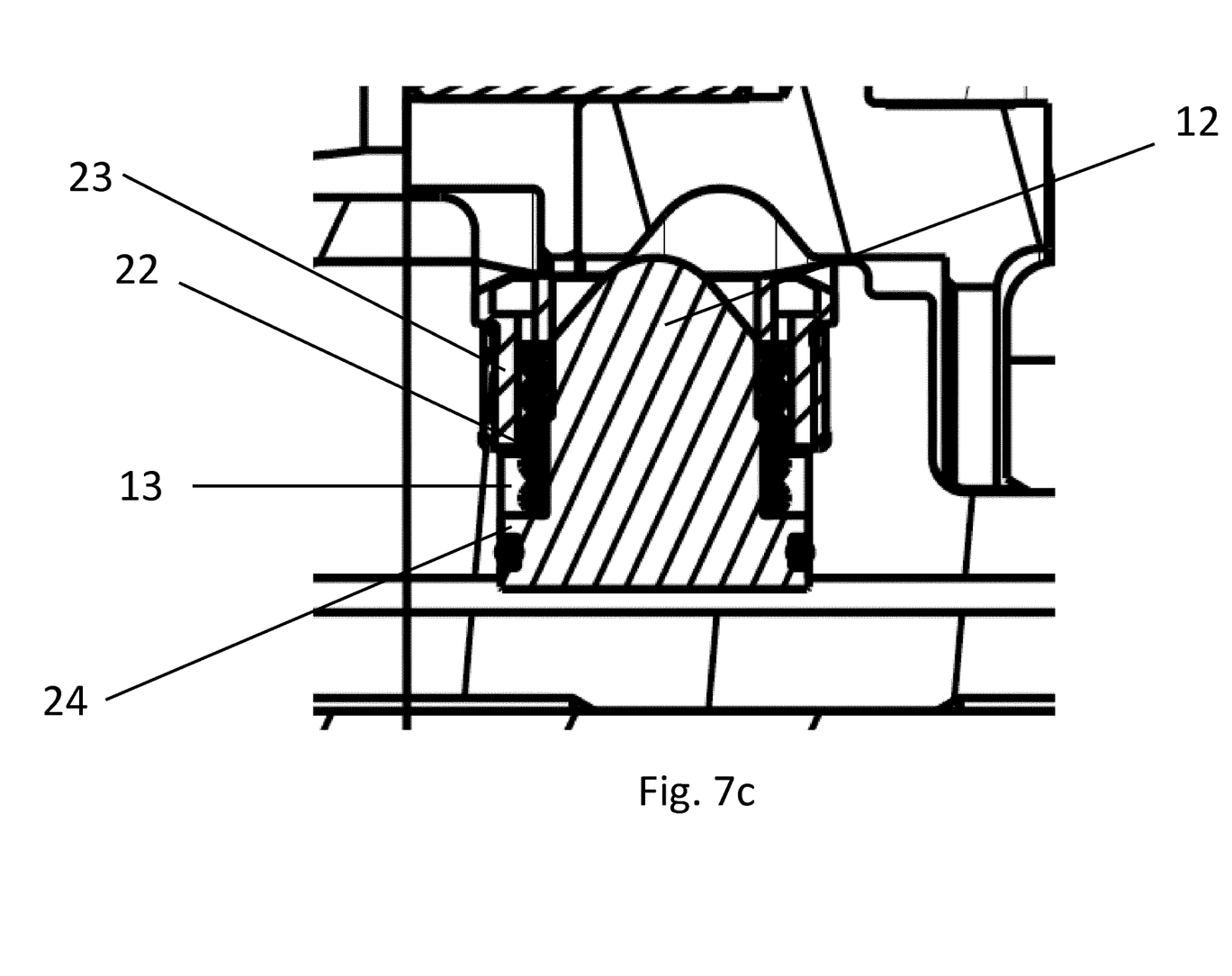

Reference is made to FIGS. 7a-7c. The plungers 12 on the tool 10 are also hydraulically driven. The outer circumferential groove 52 is arranged on the inner side of the sleeve 53 of the flying plate 50 and is adapted to receive the plungers 12. As seen on FIG. 3, a source hydraulic channel 9 is provided in the outer casing/the front housing 101 of the tool 10. A circumferential groove 21 is arranged on the outer side of the glide bush 121 in fluid connection with the hydraulic channel 9. Two circular sealing elements of the front housing 101 are arranged on each side of the groove 21 in order to achieve a sealed connection to the front housing 101 (i.e. a sealed connection between the glide bush 121 and the front housing 101). The hydraulic fluid for the plungers 12 is distributed from the hydraulic channel 9 into the circumferential groove 21, which distributes the fluid to one or more radial bores 19 in the glide bush 121, which in turn distribute(s) the fluid to one or more axial canals/channels 191 in the glide bush 121 leading to one or more plunger bores 13, each accommodating the respective plunger 12.

A plunger spring 22 is arranged around each plunger 12, providing bias when the plungers 12 are hydraulically driven out. When hydraulic power is removed, the plungers 12 are pushed inwards by means of the plunger springs 22.

Furthermore, on its outer side, the plunger 12 has a half-spherical shape or form. The internal circumferential groove 52 of the flying plate 50 will also have a respectively mating, half-spherical shape or form for mating with the spherical shape or form of the plunger 12. This is made to assist retraction of the plungers 12, in case the plunger springs 22 are not providing sufficient force to press the plungers out of the groove 52. The easy retraction is achieved due to the specified corresponding form or shape of the plunger 12 and the groove 52 and the forces applied on the plungers 12 from the movements of the flying plate 50 and/or the tool 10.

Each plunger 12 comprises a plunger collar 24 around its inner circumference. Each plunger 12 is arranged in the plunger bore 13 in the glide bush 121. A plunger retainer 23 is arranged in the bore 13 in order to abut against the plunger collar 24. This is made in order to keep the plungers 12 within the glide bush 121.

Figure 7D:
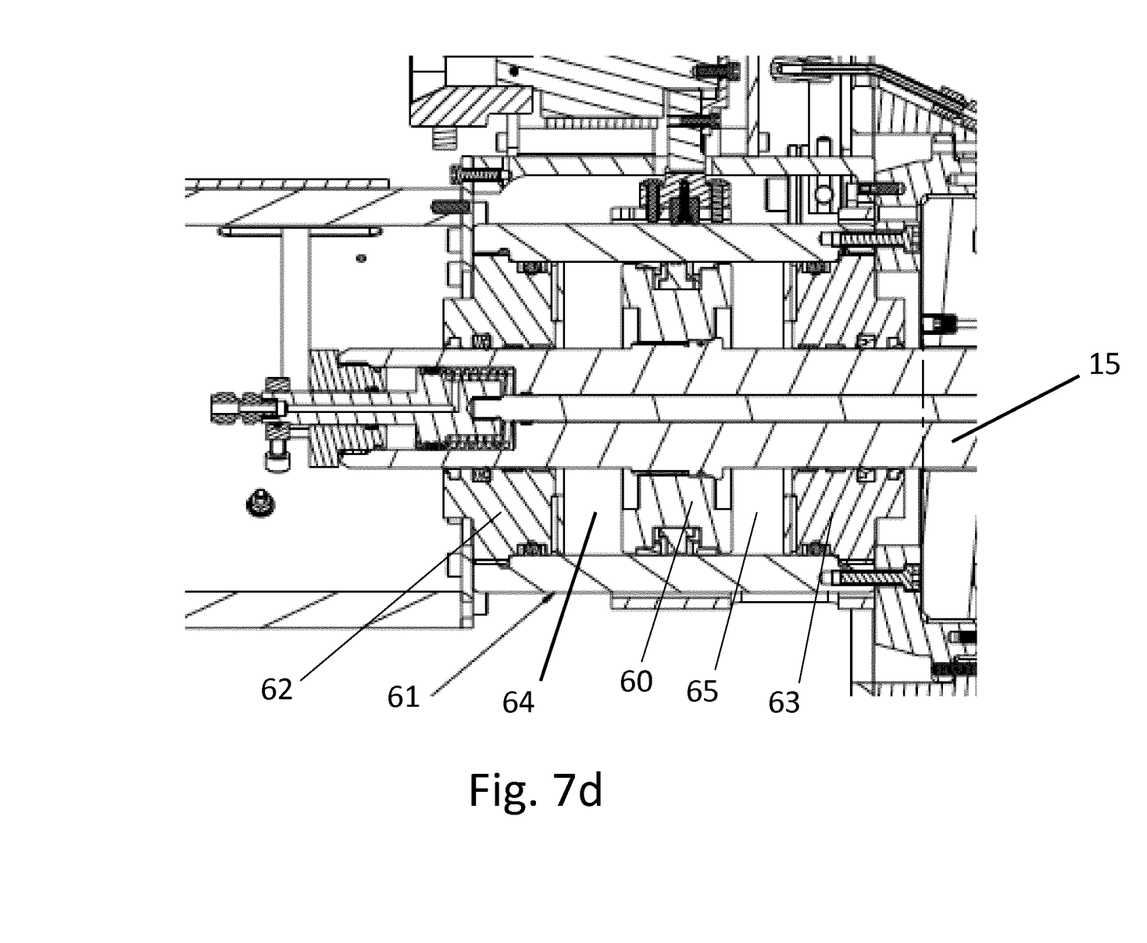

FIG. 7d shows a detail drawing of the elements that are pushing and pulling the main shaft 15 during operation. A main piston 60 is fixed to the main shaft 15 around the circumference of the main shaft 15. On the outer circumference, the main piston 60 is movably connected to a main cylinder 61. At the first and second end of the main cylinder 61, there is a first and second main cylinder end cap 62, 63, respectively. The first end cap 62 is arranged on the rearmost end section of the cylinder 61, while the second end cap 63 is arranged on the forward end section of the cylinder 61. The end caps 62 and 63 function as seals and end stops for the main piston 60.

A first fluid chamber 64 is formed between the first main cylinder end cap 62, the main piston 60, the main shaft 15 and the main cylinder 61. The main cylinder 61 will be forming the outer surface of the first fluid chamber 64 and the main shaft 15 will be forming the inner surface of the chamber 64. Correspondingly, a second fluid chamber 65 is formed between the main piston 60, the second main cylinder end cap 63, the main shaft 15 and the main cylinder 61. The first fluid chamber 64 will be at the rear side of the main piston 60, while the second fluid chamber 65 will be at the forward side of the main piston 60.

To push the main shaft 15 towards the flying plate 50 and/or the fixed plate 40, the first fluid chamber 64 is filled with hydraulic fluid, while fluid in the second fluid chamber 65 is channelled out of this chamber. When the main shaft 15 is pushed forwards, the plungers 12 will be pushed out towards the circumferential groove 52 of the flying plate 50, as described above.

To pull the main shaft 15 away from the fixed plate 40, the second fluid chamber 65 is filled with hydraulic fluid, while fluid in the first fluid chamber 64 is channelled out of this chamber. When the main shaft 15 is pulled rearwards, the plungers 12 will be pulled in towards the main axis 15. The fluid channels providing hydraulic fluid to the first 64 and the second 65 fluid chamber are not shown on the drawing, but it will be apparent to a skilled person to arrange fluid channels in connection with each fluid chamber 64, 65.

Additional modifications, alterations and adaptations of the present invention will suggest themselves to those skilled in the art without departing from the scope of the invention as expressed and stated in the following patent claims.

The invention claimed is:

1. A locking and unlocking tool for at least one of: connection and/or disconnection of a set of a flying plate and a fixed plate, the locking and unlocking tool comprising a glide bush and a front housing mounted onto the glide bush and partially covering the glide bush, wherein a main shaft is axially moveable within the glide bush, wherein a pushrod, having a cone at one end thereof, is axially moveable within the main shaft in order to operate in radial direction one or more locking dogs, wherein the locking and unlocking tool further comprises one or more plungers in the glide bush, each plunger being radially moveable within the glide bush, each plunger being outwardly and radially extendable when being subject to a force, wherein the glide bush further comprises one or more radial bores therein, each radial bore being connected, at one side to, a source hydraulic channel in the front housing and, at its other side, to a respective axial canal, each axial canal being arranged in the glide bush and dedicated for further connection to its respective plunger, said one or more plungers being hydraulically operated by a hydraulic fluid provided from a hydraulic fluid source.

2. The locking and unlocking tool according to claim 1, wherein, on its outer side, each plunger has a half-spherical shape.

3. The locking and unlocking tool according to claim 1, wherein each locking dog has an outer toroidal shape, where a number of locking dogs arranged around the cone will form a segmented ring shape.

4. The locking and unlocking tool according to claim 1, wherein each plunger comprises a plunger collar on the inner end section thereof, each plunger being arranged in a plunger bore in the glide bush, where a plunger retainer is arranged in the bore to abut against the plunger collar, and a plunger spring is arranged between the plunger retainer and the plunger collar.

5. The locking and unlocking tool according to claim 1, wherein a rear end section of the main shaft is provided with a chamber, wherein a push rod piston is arranged, a retraction spring being biased between the push rod piston and the inner surface of the chamber.

6. The locking and unlocking tool according to claim 1, wherein:
   a main piston is fixed to and encircling the main shaft,
   a main cylinder being slidably connected to and encircling the main piston,
   the main cylinder having a rear end and a forward end, a first main cylinder end cap being arranged at the rear end of the main cylinder and a second main cylinder end cap being arranged at the forward end of the main cylinder,
   the end caps being slidably connected to the main shaft and fixed to the main cylinder end sections.

7. The locking and unlocking tool according to claim 6, wherein a first fluid chamber is formed between the main shaft, the main cylinder, the first main cylinder end cap and the main piston, and a second fluid chamber is formed between the main shaft, the main cylinder, the main piston and the second main cylinder end cap, the fluid chambers being in fluid communication with the hydraulic fluid source whereby hydraulic fluid can be entered into or let out of the fluid chambers to move the main piston and thereby the main shaft.

8. A system adapted for at least one of: connection and/or disconnection of a set of a flying plate and a fixed plate, the set of the flying plate and the fixed plate comprising multiple connectors, the system comprising a locking and unlocking tool according to claim 1, a remotely operated vehicle, the flying plate arranged at an end of a bundle, and the fixed plate mounted onto a host structure or subsea installation, wherein the locking and unlocking tool is connectable to the ROV and is further adapted for at least one of: connection and/or disconnection of the plates.

9. The system according to claim 8, wherein the host structure is at least one of: X-mas tree, manifold, subsea distribution unit, umbilical termination assembly.

10. The system according to claim 8, wherein the plates comprise coarse and fine guiding means.

\* \* \* \* \*